(12) United States Patent
Kiselev et al.

(10) Patent No.: US 6,907,507 B1
(45) Date of Patent: Jun. 14, 2005

(54) TRACKING IN-PROGRESS WRITES THROUGH USE OF MULTI-COLUMN BITMAPS

(75) Inventors: Oleg Kiselev, Palo Alto, CA (US); Anand A. Kekre, Pune (IN); John A. Colgrove, Los Altos, CA (US)

(73) Assignee: Veritas Operating Corporation, Mountain View, CA (US)

( * ) Notice: Subject to any disclaimer, the term of this patent is extended or adjusted under 35 U.S.C. 154(b) by 241 days.

(21) Appl. No.: 10/326,432

(22) Filed: Dec. 19, 2002

(51) Int. Cl.[7] .............................................. G06F 12/16
(52) U.S. Cl. ................... 711/162; 711/156; 707/204; 714/6
(58) Field of Search ..................... 711/156, 162; 714/6; 707/204

(56) References Cited

U.S. PATENT DOCUMENTS

| | | | |
|---|---|---|---|
| 5,155,824 A | 10/1992 | Edenfield et al. | 395/425 |
| 5,497,483 A | 3/1996 | Beardsley et al. | 395/575 |
| 5,506,580 A | 4/1996 | Whiting et al. | 341/51 |
| 5,532,694 A | 7/1996 | Mayers et al. | 341/67 |
| 5,574,874 A | 11/1996 | Jones et al. | 395/376 |
| 5,649,152 A | 7/1997 | Ohran et al. | 395/441 |
| 5,778,395 A | 7/1998 | Whiting et al. | 707/204 |
| 5,835,953 A | 11/1998 | Ohran | 711/162 |
| 5,907,672 A | 5/1999 | Matze et al. | 395/182.06 |
| 6,073,222 A | 6/2000 | Ohran | 711/162 |
| 6,085,298 A | 7/2000 | Ohran | 711/162 |
| 6,141,734 A | 10/2000 | Razdan et al. | 711/144 |
| 6,189,079 B1 | 2/2001 | Micka et al. | 711/162 |
| 6,282,610 B1 | 8/2001 | Bergsten | 711/114 |
| 6,341,341 B1 | 1/2002 | Grummon et al. | 711/162 |
| 6,353,878 B1 | 3/2002 | Dunham | 711/162 |
| 6,434,681 B1 | 8/2002 | Armangau | 711/162 |
| 6,460,054 B1 | 10/2002 | Grummon | 707/204 |
| 6,564,301 B1 | 5/2003 | Middleton | 711/144 |
| 6,591,351 B1 | 7/2003 | Urabe et al. | 711/162 |
| 6,785,789 B1 * | 8/2004 | Kekre et al. | 711/162 |
| 2003/0041220 A1 | 2/2003 | Peleska | 711/162 |

* cited by examiner

*Primary Examiner*—Jack A. Lane
(74) *Attorney, Agent, or Firm*—Campbell Stephenson Ascolese LLP

(57) ABSTRACT

Disclosed is a method and apparatus for tracking in-progress writes to a data volume and a copy thereof using a multi-column bit map. The method can be implemented in a computer system and, in one embodiment, includes creating a data volume in a first memory, and creating a copy of the data volume in a second memory. In response to the computer system receiving a request to write first data to the data volume, the computer system switches the state of first and second bits of a map entry in a memory device, wherein the state of the first and second bits are switched using a single write access to the memory device.

16 Claims, 4 Drawing Sheets

TRACKING IN-PROGRESS WRITES THROUGH USE OF MULTI-COLUMN BITMAPS

BACKGROUND OF THE INVENTION

Many businesses rely on large-scale data processing systems for storing and processing their data. Insurance companies, banks, brokerage firms, etc., rely heavily on data processing systems. Often the viability of a business depends on the reliability of access to data contained within its data processing system. As such, businesses seek reliable ways to consistently protect their data processing systems and the data contained therein from natural disasters, acts of terrorism, or computer hardware and/or software failures.

Businesses must be prepared to eliminate or minimize data loss and recover quickly with useable data after an unpredicted event such as a hardware or software failure in the data processing system. When an unexpected event occurs that causes loss of data, businesses often recreate the data using backup copies of their data made of magnetic storage tape. Restoring data from a backup tape is typically a time-consuming process that often results in a substantial loss of business opportunity. Business opportunity is lost because the data processing system cannot process new data transactions while data is being recreated from backup copies. Further, restoration from tape usually involves loss of data. For most businesses, this kind of data loss and down time is unacceptable. Mirrored data volume and virtual point-in-time (PIT) backup technologies offer better solutions for full and accurate restoration of business critical data. Mirrored data volume and virtual PIT technologies not only minimize or eliminate data loss, but also enable rapid recovery of a data processing system when compared to conventional bulk data transfer from sequential media.

FIG. 1 illustrates an exemplary data processing system 10 that employs mirrored data volume and virtual PIT backup technology. Data processing system 10 includes a host node 12 coupled to data storage systems 14–18. Data storage systems 14–18 include data memories 24–28, respectively. As will be more fully described below, data memory 24 stores a primary data volume, data memory 26 stores a virtual PIT backup copy of the primary data volume, and data volume 28 stores a mirrored copy of the data volume. Data processing system 10 shown in FIG. 1 and its description herein should not be considered prior art to the invention disclosed and/or claimed.

Host node 12 may take form in a computer system (e.g., a server computer system) that received and processes requests to read or write data to the primary data volume stored within memory 24. In response to receiving these requests, host node 12 generates read or write-data transactions for reading or writing data to the primary data volume within data memory 24. It is noted that host node 12 is capable of accessing each of the memories 24–28 or memory internal to host node 12 for reading or writing data to the data volumes stored therein.

Each of the data memories 24–28 may include several memory devices such as arrays of magnetic or optical discs. The primary data volume maybe distributed across several memory devices of memory 24. Likewise, the virtual PIT copy of the primary data volume is distributed across several memory devices of data memory 26, and the mirrored copy of the primary data volume is distributed across several memory devices of data memory 28. Each of the data memories 24–28 may include $n_{max}$ physical memory blocks into which data can be stored. More particularly, data memory 24 includes $n_{max}$ memory blocks allocated by host node 12 for storing data of the primary data volume, data memory 26 includes $n_{max}$ memory blocks allocated to store the virtual PIT backup copy of the primary data volume, and data memory 28 includes $n_{max}$ memory blocks allocated to store the mirrored copy of the primary data volume. Corresponding memory blocks in data memories 24–28 are equal in size. Thus, memory block 1 of data memory 24 is equal in size to memory block 1 of data memories 26 and 28.

Host node 12 creates the virtual PIT backup copy of the primary data volume according to the methods described in copending U.S. patent application Ser. No. 10/143,059, filed May 10, 2002 entitled "Method and Apparatus for Creating a Virtual Data Copy," and U.S. patent application Ser. No. 10/254,753, filed Sep. 25, 2002 and entitled "Method and Apparatus for Restoring a Corrupted Data Volume," each of which is incorporated herein by reference in entirety. These references describe how host node 12 reads and writes data to the virtual PIT copies. Additionally, the above referenced applications describe how the virtual PIT backup copy can be converted to a real PIT backup copy using a background copying process executed by host node 12.

Host node 12 creates the virtual PIT backup copy of the primary data volume when host node receives or internally generates a command to create a PIT copy of the primary data volume. Initially (i.e., before any virtual PIT copy is created in data memory 26) data memory 26 contains no data. When host node 12 creates the first virtual PIT backup copy in memory 26, host node 12 creates a pair of valid/modified (VM) maps, such as maps 30 and 32 shown in FIG. 2. FIG. 2 also shows a third map 34 which will be more fully described below. VM maps 30 and 32 corresponds to the primary data volume and the virtual PIT copy thereof, respectively, stored within data memories 24 and 26, respectively. Hence, VM maps 30 and 32 will be referred to as primary VM map 30 and PIT backup copy VM map 32.

Each of the VM maps 30 and 32 include $n_{max}$ entries, each entry having two bits. Each entry of primary VM map 30 corresponds to a respective block of data memory 24, while each entry of the virtual PIT backup copy VM map 32 corresponds to a respective block of data memory 26. The first and second bits in each entry of VM maps 30 and 32 are designated $V_n$ and $M_n$, respectively. $V_n$ of each entry, depending on its state (i.e., logical 0 or logical 1), indicates whether block n of the associated memory contains valid data. $V_n$ of the primary VN map 30 indicates whether a corresponding memory block n in memory 24 stores valid data. For example, when set to logical 1, $V_2$ of VM map 30 indicates that block 2 of data memory 24 contains valid data of the primary data volume, and when set to logical 0, $V_2$ of the VM map 30 indicates that block 2 of data memory 24 contains no valid data of the primary data volume. $V_n$ of the PIT backup copy VM map 32 indicates whether memory block n in memory 26 stores a valid point-in-time copy of data in block n of memory 24. For example, $V_2$ of VM map 32, when set to logical 1, indicates that block 2 of memory 26 contains a valid copy of data that existed in block 2 of memory 24 at the time the pit backup copy was first created or at the time the PIT backup copy was last refreshed. Copending U.S. application Ser. No. 10/326,427, filed Dec. 19, 2002, entitled "Instant Refresh of A Data Volume" describes one method of refreshing a PIT backup copy and is incorporated herein by reference in entirety. $V_2$ of VM map 32, when set to logical 0, indicates that block 2 of memory 26 does not contain a valid copy of data. The $V_n$ bit of PIT backup copy VM map 32 is used to determine when data in block n of memory 24 is to be copied to block n of memory 26. More particularly, when host node 12 generates a write-data transaction for writing data to block n of memory 24, host node 12 checks the status of $V_n$ in PIT backup copy VM map 32. If $V_n$ is set to logical 0, then the PIT backup copy in memory 26 lacks a valid copy of data of block n in memory 24. Before data can be written to block n of memory 24 in accordance with the write-data transaction, data in block n of memory 24 must first be copied to block n of memory 26. If, on the other hand, $V_n$ is set to logical 1, data can be written to block n of memory 24 in accordance with the write-data transaction without first copying data to block n of memory 26.

$M_n$ in each entry of VM map 30 and PIT copy VM map 32, depending upon its state, indicates whether data within a respective block n of the corresponding memory is modified (or new) since the time the PIT backup copy was first created or last refreshed. For example, when set to logical 1, $M_3$ of the primary VM map 30, indicates that block 3 of data memory 24 contains data which has been modified since the time the PIT backup copy was first created or last refreshed. When set to logical 0, $M_3$ of the primary VM map of 30 indicates that data has been modified or written to Block 3 of data memory 24 since the time the PIT backup copy was first created or refreshed.

When VM maps 30 and 32 are first created by host node 12, each entry of PIT VM map 32 is set to logical 0 thus indicating that data memory 24 contains no valid or modified data. For purposes of explanation, it is presumed that each block of data memory 24 contains valid data of the primary volume. Accordingly, VM of each entry within primary VM map 30 is initially set to logical 1. Lastly, $M_n$ of each entry in primary VM map 30 is initially set to logical 0.

As noted above, data memory 28 stores a mirrored copy of the primary data volume. A mirrored copy is considered a real time copy of the primary data volume. Each time host node 12 writes data to the primary data volume stored in memory 24 via a write-data transaction, host node also generates a transaction to write the same data to the mirrored copy stored within memory 28. Thus, the mirrored copy, as its name implies, closely tracks the changes to the primary data volume. The mirrored copy within memory 28 provides an immediate backup data source in the event that data storage system 14 fails as a result of hardware and/or software failure. If data storage system 14 suddenly becomes unusable or inaccessible, host node 12 can service client computer system read or write requests using the mirrored volume within data memory 28.

Host node 12 is also subject to hardware and/or software failure. In other words host node 12 may crash. When host node 12 recovers from a crash, host node 12 expects contents of the primary data volume to be consistent with the contents of the primary data volume. Unfortunately, host node 12 may crash after a write-data transaction is completed to data memory 24, but before the mirrored copy can be updated with the same data of the write-data transaction. If this is to happen, the contents of the primary data copy stored in memory 24 will be inconsistent with the mirrored copy in memory 28 when host node 12 recovers from its crash.

Host node 12 uses the dirty region (DR) map 34 shown in FIG. 2 to safeguard against inconsistencies between memories 24 and 28 after crash recovery. DR map 34 includes $n_{max}$ entries corresponding to the $n_{max}$ memory blocks in data memories 24 and 28. Each entry includes one bit which, when set to logical 0 or logical 1, indicates whether respective memory blocks in data memories 24 and 28 are the subject of an in-progress write-data transaction. For example, host node 12 sets $DR_2$ to logical 1 before host node 12 writes data to memory block 2 in data memories 24 and 28. Setting or clearing a bit in DR map 34 requires a write (i.e., an I/O operation) to memory that stores DR map 34. After the write transaction is completed to memory block 2 of data memories 24 and 28, host node 12 switches the state of $DR_2$ back to 0 using another write operation.

If host node 12 crashes, the contents of DR map 34 is preserved. After recovering from the crash, host node 12 copies the contents of memory blocks in data memory 24 to respective memory blocks in data memory 28, or vice versa, for each respective $DR_n$ bit set to logical 1 in DR map 34. After these memory blocks are copied, host node 12 is ensured that the primary data volume of data memory 24 is consistent with the mirrored copy of data memory 28.

Host node 12 is burdened by having to generate two separate write operations to update VM map 30 and DR map 34 with each write-data transaction to the primary data volume. More particularly, with each write-data transaction host node 12 must generate a first write operation to update VM map 30 and a second write operation to update DR map 34. Additionally, a substantial amount of time is needed to complete separate write operations to VM map 30 and DR map 34. To illustrate, FIG. 3 is a flow chart illustrating operational aspects of modifying or writing data of the primary volume within data memory 24 in accordance with a write-data transaction. More particularly, when host node 12 receives a request to write data to the primary volume from one of the computer systems, host node 12 generates a write-data transaction to write data to block n of memory 24. In step 42, host node 12 accesses VM map 32 to determine whether $V_n$ is set to logical 1. If $V_n$ of the VM map 32 is set to logical 0, then host computer 12, as shown in step 44, copies the contents of block n of memory 24 to the corresponding block n in memory 26. Thereafter, in step 46 host computer 12 sets $V_n$ of the VM map 32 to logical 1. Before host computer system 12 writes or modifies data of block n of memory 24 that stores a portion of the primary volume and block n of memory 28 that stores a portion of the mirrored copy, host computer system 12 must set $M_n$ and $DR_n$ of primary VM map 30 and DR map 34, respectively, to logical 1. It is noted that $M_n$ and $DR_n$ are in separate tables, and thus have separate addresses within memory. Accordingly, host computer system 12 must generate separate writes or IO functions to set $M_n$ and $DR_n$ to logical 1. The time it takes, for example, for the read/write head (not shown) to travel across a magnetic disc to reach the appropriate sector that stores $M_n$ of VM map 30, followed by the time it takes for the magnetic read/write to travel across the magnetic disc to reach another sector that stores $DR_n$ of the DR map 34, may be substantial. Once $M_n$ and $DR_n$ are set to logical 1 in steps 50 and 52, host node 12 writes data to block n in memory 24 as shown in step 54 and writes data to block n of memory 28.

SUMMARY OF THE INVENTION

Disclosed is a method and apparatus for tracking in-progress writes to a data volume and a copy thereof using a multi-column bit map. The method can be implemented in a computer system and, in one embodiment, includes creating a data volume in a first memory, and creating a copy of the data volume in a second memory. In response to the computer system receiving a request to write first data to the data volume, the computer system switches the state of first and second bits of a map entry in a memory device, wherein the state of the first and second bits are switched using a single write access to the memory device.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figures 4, 5:
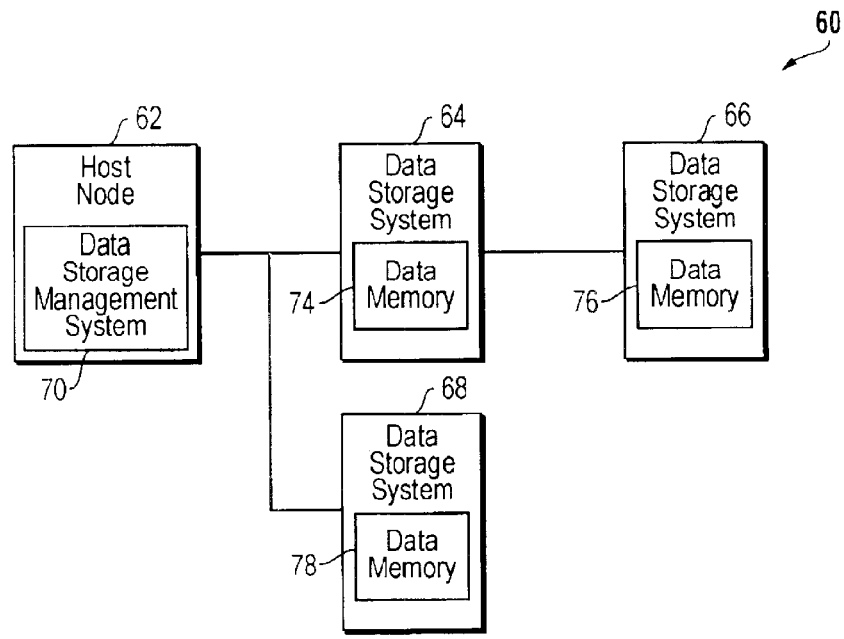
FIG. 4 is a block diagram of a data processing system employing one embodiment of the present invention.
FIG. 5 is a block diagram of VM/DR and VM maps created by the host node shown in FIG. 4.

The present invention relates to an apparatus and method for tracking in-progress write I/O's through the use of multi-column bit maps. FIG. 4 illustrates (in block diagram form) relative components of a data processing system 60 employing one embodiment of the present invention. Data processing system 60 is similar to data processing system 10 of FIG. 1. Data processing system 60 includes a host node 62 coupled to data storage systems 64–68. It is noted that the term "coupled devices" should not be limited to devices coupled directly together by a communication link. Two devices may be coupled together even though communication occurs through an intervening device.

Data storage systems 64–68 include memories 74–78, respectively. Memory 74 stores one or more primary data volumes. For purposes of explanation, memory 74 stores one primary data volume, it being understood that the present invention will not be limited thereto. Memory 76 stores a point-in-time (PIT) backup copy of the primary data volume whether real or virtual, while memory 78 stores a mirrored copy of the primary data volume.

The primary data volume (and the PIT backup and mirrored copies thereof) is a collection of files that store data. While it is said that files store data, in reality data is stored in physical blocks of memory 74 which are allocated to the files by host node 62. Host node 62 may take form in a computer system (e.g., a server computer system) that includes a data storage management system 70 in the form of software instructions executing on one or more data processors (not shown). Data storage management system 70 may include a file system (not shown) and a system (not shown) for managing the distribution of volume data across several memory devices. Volume Manager™ provided by Veritas Corporation of Mountain View, Calif., is an exemplary system for managing the distribution of volume data across several memory devices. Host node 62 generates read or write-data transactions in response to host node 62 receiving requests from client computer systems to read or write data to the primary data volume.

As noted, memories 74–78 store the primary data volume, the PIT backup copy of the primary data volume, and the mirrored copy of the primary data volume, respectively. Data memories 74–78 may take form in one or more dynamic or static random access memories, one or more arrays of magnetic or optical data storage disks, or combinations thereof. Data memories 74–78 should not be limited to the foregoing hardware components; rather, data memories 74–78 may take form in any hardware, software, or combination of hardware and software in which data may be accessed and persistently stored. Data memories 74–78 may take form in a complex construction of several hardware components operating under the direction of software. The memories may take form in mirrored hardware. It is further noted that the present invention may find use with many types of redundancy/reliability systems. For example, the present invention may be used with Redundant Array of Independent Disks (RAID) systems. Moreover, the present invention should not be limited to use in connection with the host node of a data storage network. The present invention may find use in a storage switch or in any of many distinct appliances that can be used with a data storage system.

Each of the data memories 74–78 includes $n_{max}$ physical blocks of memory into which data can be stored. It is noted that any or all of the memories 74–78 may have more than $n_{max}$ memory blocks. However, the first $n_{max}$ blocks in memories 74–78 are allocated by host node 62 for storing the primary data volume, the PIT backup copy of the primary data volume, and the mirrored copy of the primary data volume, respectively. Corresponding memory blocks in memories 74–78 are equal in size. Thus, memory blocks 1 of memory 74 is equal in size to memory blocks 1 in memories 74 and 76. Each of the memory blocks within memory 74 may be equal in size to each other. Alternatively, the memory blocks in memory 74 may vary in size.

Host node 62 can access each of the blocks in memories 74–78 in response to generating read or write-data transactions. The read or write-data transactions are generated by host node 62 in response to host node 62 receiving read or write requests from client computer systems coupled thereto. The primary data volume stored in memory 74 is the "working" volume of data processing system 60. Thus, when client computer systems request a read or write access to data, the access is directed to the primary data volume. The PIT backup copy of the primary data volume acts as a safeguard against data corruption of the primary data volume due to a software or operator error. The mirrored copy within memory 78 provides a alternative source to data in the event that data storage system 64 is rendered inaccessible to host node 62 due to hardware and/or software failure.

Host node creates a virtual PIT backup copy of the primary data volume by creating primary VM/DR map 80 and a PIT VM map 82 shown within FIG. 5. These maps may be stored within one of the memories 74–78, in a memory within host node 62 or in a memory (not shown) attached to host node 62. The contents of each of the maps 80 and 82 is accessible by host node 62 using a read or write operation. Maps 80 and 82, like maps 30 and 32 described above, include $n_{max}$ entries. Each entry of primary VM/DR map 80 corresponds to a respective blocks of data memories 74 and 78, while each entry of the VM map 82 corresponds to a respective block of data memory 76. VM map 82 is substantially similar to map 32, while VM/DR map 80 is substantially similar to a combination of VM map 30 and DR map 34.

Each entry in primary VM/DR map 80 consists of three bits designated $V_n$, $M_n$, and $DR_n$. $V_n$ in the primary VM/DR map, depending on its state, indicates whether a corresponding block in memory 74 contains valid primary volume data. For example, when set to logical 1, $V_2$ of the primary VM/DR map 80 indicates that block 2 of memory 74 contains valid primary volume data, and when set to logical 0, $V_2$ of primary VM/DR map 80 indicates that block 2 of data memory 74 contains no valid primary volume data. $V_2$ of VM map 82, when set to logical 1, indicates that block 2 of memory 76 contains a valid copy of data that existed in block 2 of memory 74 at the time the PIT backup copy was first created or at the time the PIT backup copy was last refreshed. $V_2$ of VM map 82, when set to logical 0, indicates that block 2 of memory 76 does not contain a valid copy of data.

$M_n$ in each entry of primary VM/DR map 80, depending upon its state, indicates whether data has been written to or modified in the corresponding block n of memory 74 since the last time the PIT backup copy of the primary data volume was created or refreshed. For example, when set to logical 1, $M_3$ of primary VM/DR map 80 indicates that data has been written to block 3 of memory 74 since the last time PIT backup copy was refreshed. Likewise, when set to logical 0, $M_3$ of the primary VM/DR map 80 indicates that data has not been written or modified in block 3 of the memory 74 since the last time a PIT backup copy was refreshed.

$DR_n$ in each entry, depending on its state, indicates whether the corresponding block n of memories 74 and 79 are the subject of an in-progress write-data transaction. For example, when set to logical 1, $DR_5$ of VM/DR map 80 indicates that memory block 5 of memories 74 and 78 are the subject of an in-progress write-data transaction. When set to logical 0, $DR_5$ of primary VM/DR map 80 indicates that memory block 5 of memories 74 and 78 are not the subject of an in progress write transaction.

Multiple bits in entries of primary VM/DR map 80 are can be set by host node 62 using a single write operation to memory that stores VM/DR map 80. In one embodiment, multiple bits of an entry can be updated with a single write operation since the bits are stored adjacent to each other in the memory that stores VM/DR map 80. More particularly, host node can write a multi-bit binary value to an entry of VM/DR map 80 using a single write operation thereby updating or changing one or more bits of the entry. For example, suppose $V_3$, $M_3$, and $DR_3$ of entry 3 of VM/DR map 80 are initially set to logical 1, logical 0, and logical 0, respectively. In other words, entry 3 of VM/DR map 80 stores binary value "100" where the most significant bit (i.e., the left most bit) corresponds to $M_3$ and the least significant bit (i.e., the right most bit) corresponds to $DR_3$. Suppose further that host node 62 generates a write-data transaction for writing data to block 3 of memory 74. Before or after host node 62 writes data to block 3, host node 62 can write the binary value "111" to entry 3 of VM/DR map 80 thereby changing the state of $M_3$ and $DR_3$ from logical 0 to logical 1 ($V_3$ is maintained at logical 1 even though $V_3$ may be overwritten) using a single write operation. In contrast host node 12, described in the background section above, requires separate operations to update $M_3$ of VM map 30 and $DR_3$ of DR map 34 where one operation changes the state of $M_3$ of VM map 30 while the other operation changes the state of $DR_3$ of DR map 34. It is noted that host node 62 in this example could write the binary value "x11" to entry 3 of VM/DR map 80 instead of the binary value "111." In this alternative embodiment, $V_3$ could be masked from the write operation so that it is not overwritten by the binary value "x." Indeed, any one of the $V_n$, $M_n$, or $DR_n$ bits can be masked when a multi-binary value is written to VM/DR map.

In yet another alternative embodiment, multiple multi-bit entries in VM/DR map 80 can b modified by host node 62 via a single write operation. For example, suppose host node 62 generates a write-data transaction for writing data to block 4 of memory 74 after host node writes data to block 3 of memory 78. Further suppose that entries 3 and 4 of VM/DR map 80 store binary values "111" and "100," respectively, at the time host node 62 generates the write-data transaction for writing data to block 4 or memory 74. $DR_3$ is set to logical 1 thus indicating that block 3 in memories 74 and 76 are the subject of a write data transactions when, in fact, they are not. VM/DR map 80 can be updated, before or after data is modified in block 4 of memory 78 in accordance with the new write-data transaction, by writing binary values "110" and "111" to entries 3 and 4, respectively, via a single write operation since entries 3 and 4 rather than two write operations where the first operation writes binary value "110" to entry 3 and the second operation writes binary value "111" to entry 4. Entries 3 and 4 can be updated with a single write operation since entries 3 and 4 of map 80 are adjacent to each other in the memory that stores VM/DB map 80. It is noted that $V_3$, $V_4$, and $M_3$ are not updated in the sense that the value of these bits do not change after the single write operation to VM/DR map 80. After the single write operation, $DR_3$ is properly updated to logical 0 thus indicating that block 3 in memories 74 and 78 are no longer subject to a write-data transaction, and $M_4$ is updated to logical 1 thus indicating that data of block 4 in memory 74 has been modified.

Figure 6:
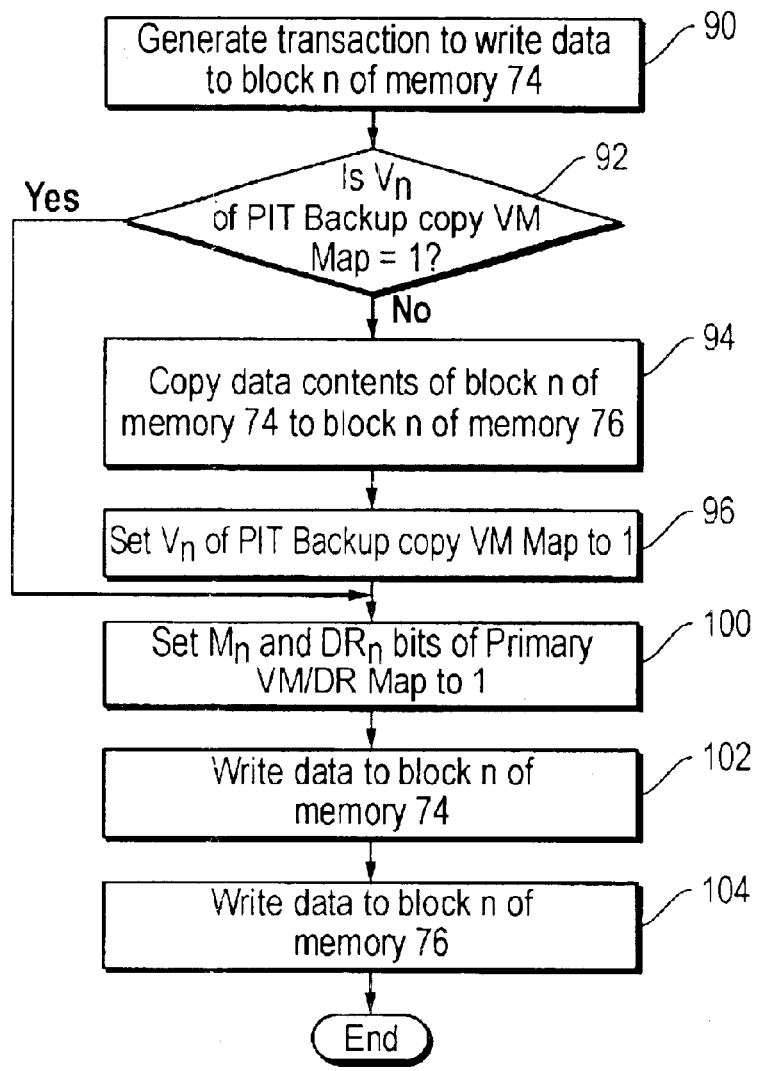
FIG. 6 is a flow chart illustrating operational aspects of writing or modifying data in the primary data volume and the mirrored copy thereof of the data processing system shown in FIG. 4, after creation of a virtual PIT backup copy of the primary data volume.

Operational aspects of tracking in-progress writes is best understood with reference to the flow chart of FIG. 6 which shows operational aspects of one embodiment of the present invention. Tracking in-progress writes begins after host node 62 receives a request to write data to the primary data volume. Host node 62 identifies the block n of memory 74 that is the target of the received write request. Host node 62 generates a write-data transaction for writing data to block n in step 90. Host node 62, in step 92, accesses VM map 82 to determine the state of $V_n$. If $V_n$ is set to logical 0, then host node 62 copies the data of block n in memory 74 to block n of memory 76 and subsequently sets $V_n$ of VM map 82 to logical 1 with a write operation to the memory that stores map 82. If $V_n$ of VM map 82 is determined to be set to logical 1 in step 92 or after $V_n$ is set to logical 1 in step 96, the process proceeds to step 100 were host node sets $M_n$ and $DR_n$ bits of VM/DR map 80 using a single write operation to memory that stores VM/DR map 80. Thereafter in steps 102 and 104, block n of memories 64 and 68 are updated with the write data of the request in step 90. It is noted that steps 102 and 104 can be reversed in order or performed in parallel. Eventually, when block n of memories 64 and 68 have been updated with the new data, host node 62, in synchronous fashion, accesses entry n of VM/DR map 80 and sets the $DR_n$ bit to logical 0, thus indicating that the data write transaction to block n of memories 74 and 78 have completed and block n of memory 74 stores valid and modified data.

Figure 1:
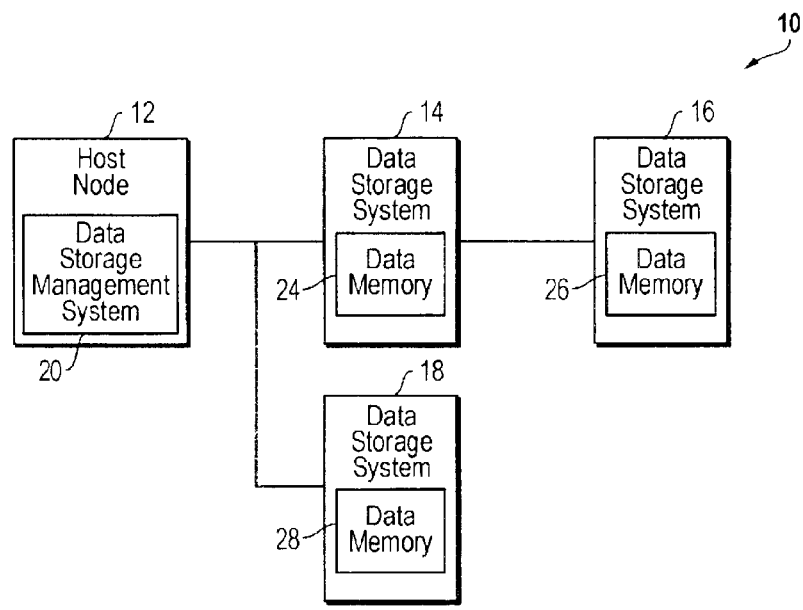
FIG. 1 is a block diagram of a data processing system.
Figure 2:
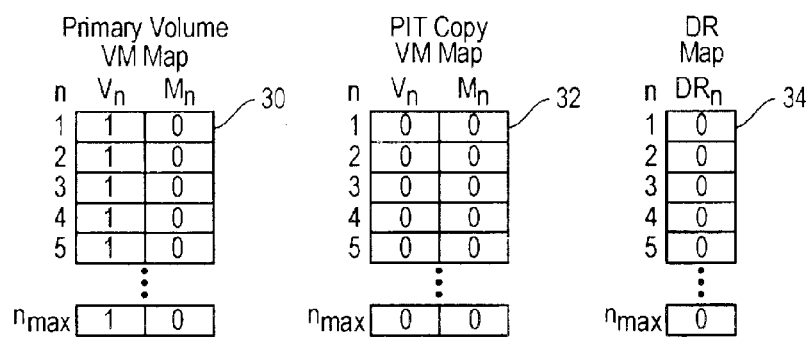
FIG. 2 is a block diagram of VM and DR maps created by the host node shown in FIG. 1.
Figure 3:
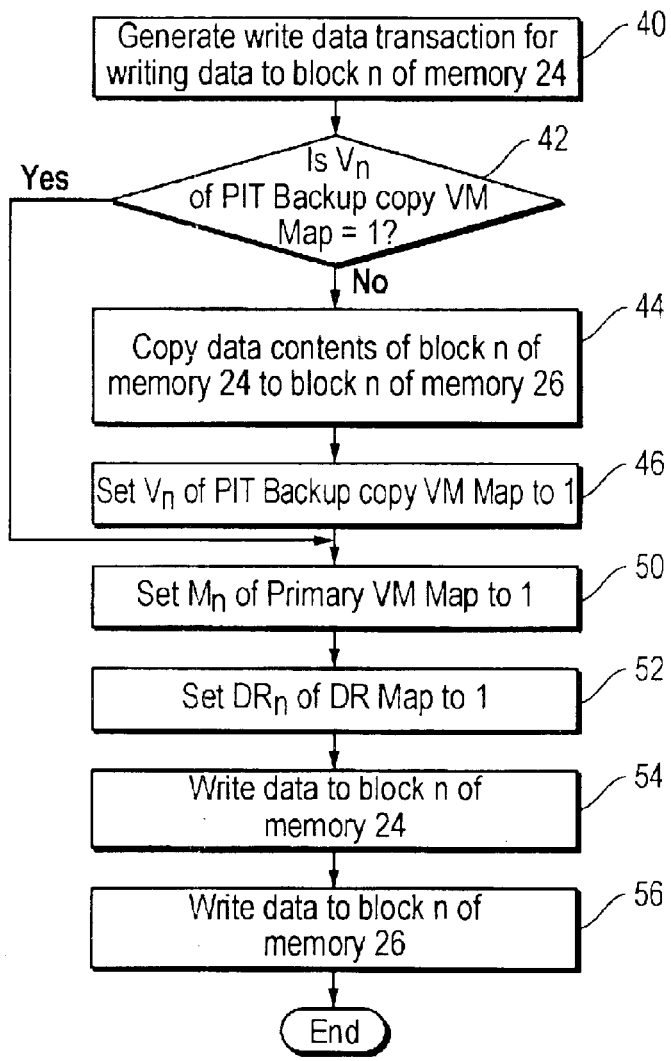
FIG. 3 is a flow chart illustrating operational aspects of writing or modifying data in the primary data volume and the mirrored copy thereof, after creation of a virtual PIT backup copy of the primary data volume.

Because only one write operation is needed to update the $M_n$ and $DR_n$ bits of primary VM/DR map 80, the amount of processing overhead on host node 62 is reduced when compared to host node 12 in FIG. 1. Moreover, because write operations of step 100 shown in FIG. 6 requires a single access to a physical address within memory that stores the primary VM/DR map 80, the amount of time needed to perform $M_n$ and $DR_n$ updating is substantially reduced.

We claim:

1. A method comprising:

creating a data volume in a first memory;

creating a copy of the data volume, wherein the copy is created in a second memory;

a computer system receiving a request to write first data to the data volume;

switching the state of a pair of bits in a memory device in response to the computer system receiving the request to write first data to the data volume, wherein the state of the pair of bits are switched using a single write access to the memory device.

2. The method of claim 1 further comprising allocating memory of the memory device for a map, wherein the map comprises an entry, wherein the entry comprises the pair of bits.

3. The method of claim 2 further comprising:

writing the first data to a memory block in the first memory;

writing the first data to a memory block in the second memory;

switching the state of one or the pair back to its original state after writing the first data to the memory blocks of the first and second memory.

4. The method of claim 3:

wherein a first bit of the pair, when switched to a first or second state, indicates that data has been written to the first memory after allocation of the memory for the map;

wherein a second bit of the pair, when switched to a first or second state, indicates that the first and second memories will be subject to a write operation.

5. The method of claim 1 further comprising:

creating a map in the memory device, wherein the map comprises a plurality of entries, each entry comprising first, second and third bits;

wherein each entry corresponds to a respective memory block in the first memory;

wherein each first bit, when set to a first or second state, indicates whether its respective memory block of the first memory stores valid data;

wherein each second bit, when set to a first or second state, indicates whether its respective memory block of the first memory stores data which has been modified since creation of the data volume copy in the second memory;

wherein each third bit, when set to a first or second state, indicates whether its respective memory block of the first memory will be subject to a write operation, and;

wherein the pair of bits are the second and third bits, respectively, of one entry of the map.

6. A computer readable medium comprising instructions executable by a computer system, wherein the computer system performs a method in response to executing the instructions, the method comprising:

creating a data volume in a first memory coupled to the computer system;

creating a copy of the data volume, wherein the copy is created in a second memory coupled to the computer system;

switching the state of a pair of bits in a memory device in response to the computer system receiving a request to modify first data of the data volume, wherein the state of the pair of bits are switched using a single write access to the memory device.

7. The computer readable medium of claim 6, wherein the method further comprises allocating memory of a memory device for a map, wherein the map comprises an entry, wherein the entry comprises the pair of bits.

8. The computer readable medium of claim 7 wherein the method further comprises:

modifying the first data, wherein the first data is stored in a memory block in the first memory;

modifying data in the second memory;

switching the state of one bit of the pair back to its original state after modifying data in the second memory.

9. The computer readable medium of claim 7:

wherein one bit of the pair, when switched to a first or second state, indicates that data in the first memory was modified after allocation of the memory for the map;

wherein the other bit of the pair, when switched to a first or second state, indicates that the first and second memories are subject to write operation.

10. The computer readable medium of claim 7 wherein the method further comprises:

creating a map in the memory device, wherein the map comprises a plurality of entries, each entry comprising first, second, and third bits;

wherein each entry corresponds to a respective memory block in the first memory;

wherein each first bit, when set to a first or second state, indicates whether its respective memory blocks of the first memory stores valid data;

wherein each second bit, when set to a first or second state, indicates whether its respective memory block of the first memory stores data which has been modified since creation of the data volume copy in the second memory;

wherein each third bit, when set to a first or second state, indicates whether its respective memory block of the first memory will be subject to a write operation, and;

wherein the pair of bits are the second and third bits, respectively, of one entry of the map.

11. A computer readable medium comprising instructions executable by a computer system, wherein the computer system performs a method in response to executing the instructions, the method comprising:

creating a data volume in first memory coupled to the computer system;

creating a mirror of the data volume, wherein the mirror is created in a second memory coupled to the computer system;

creating a map in a memory device, wherein the map comprises a plurality of entries, wherein each entry comprises first and second bits;

wherein each first bit, when set to a first or second state, indicates whether data has been written to a respective block of the first memory since allocation of memory for the map;

wherein each second bit, when set to a first or second state, indicates whether respective blocks in the first and second memories will be subject to separate in-progress write operations.

12. The computer readable medium of claim 11 wherein each of the plurality of entries comprises a third bit, wherein the third bit, when set to a first or second state, indicates whether respective blocks in the first memory contains valid data.

13. A method implemented in a computer system, the method comprising:

creating a data volume, a portion of which is stored in a first memory block;

creating a mirror of the data volume, a portion of which is stored in a second memory block;

creating a map in a memory device, wherein the map comprises a plurality of entries, wherein one of the plurality of entries comprises first and second bits;

the computer system receiving a request to write first data to the first memory block;

switching the state of the first and second bits after the computer system receives the request;

writing the first data to the first and second memory blocks;

switching the state of the second bit after the first data is written to the second memory block.

14. A computer readable medium comprising instructions executable by a computer system, wherein the computer system performs a method in response to executing the instructions, the method comprising:

creating a data volume, a portion of which is created in a first memory block;

creating a copy of the data volume, a portion of which is created in a second memory block;

creating a map in a memory device, wherein the map comprises a plurality of entries, wherein one of the plurality of entries comprises first and second bits, wherein the first bit, depending on its state, indicates whether data has been written to the first memory block since allocation of memory for the map, wherein the second bit, depending on its state, indicates that the data contents of the first memory block should be overwritten with the data contents of the second memory block or vice versa;

switching the states of the first and second bits with a single write access to the memory device.

15. A data processing system comprising:

a first memory for storing a data volume;

a second memory for storing a mirrored copy of the data volume;

a host node coupled to receive a request to write new data to or modify existing data of the data volume;

wherein the host node is configured to switch the state of first and second bits in a memory device in response to the host node receiving the request to write new data to or modify existing data of the data volume, wherein the state of the first and second bits are switched using a single write access to the memory device.

16. A data processing system comprising:

a first memory for storing a data volume;

a second memory for storing a mirrored copy of the data volume;

a means coupled to receive a request to write new data to or modify existing data of the data volume;

wherein the means is configured to switch the state of first and second bits in a memory device in response to the means receiving the request to write new data to or modify existing data of the data volume, wherein the state of the first and second bits are switched using a single write access to the memory device.

* * * * *

UNITED STATES PATENT AND TRADEMARK OFFICE
CERTIFICATE OF CORRECTION

PATENT NO. : 6,907,507 B1
DATED : June 14, 2005
INVENTOR(S) : Kiselev et al.

It is certified that error appears in the above-identified patent and that said Letters Patent is hereby corrected as shown below:

Column 10,
Line 28, claim 10 should read as follows:

--10. The computer readable medium of claim 7 wherein the method further comprises:
creating a map in the memory device, wherein the map comprises a plurality of entries, each entry comprising first, second, and third bits;
wherein each entry corresponds to a respective memory block in the first memory;
wherein each first bit, when set to a first or second state, indicates whether its respective memory block of the first memory stores valid data;
wherein each second bit, when set to a first or second state, indicates whether its respective memory block of the first memory stores data which has been modified since creation of the data volume copy in the second memory;
wherein each third bit, when set to a first or second state, indicates whether its respective memory block of the first memory will be subject to a write operation, and;
wherein the pair of bits are the second and third bits, respectively, of one entry of the map.--.

Signed and Sealed this

Fourteenth Day of March, 2006

JON W. DUDAS
*Director of the United States Patent and Trademark Office*